April 30, 1963     T. J. REED     3,087,350
SPROCKET FOR SAW CHAIN

Filed July 31, 1961     2 Sheets-Sheet 1

INVENTOR
Troy J Reed
By
Pierce, Scheffler & Parker
Attorneys.

April 30, 1963 T. J. REED 3,087,350
SPROCKET FOR SAW CHAIN
Filed July 31, 1961 2 Sheets-Sheet 2
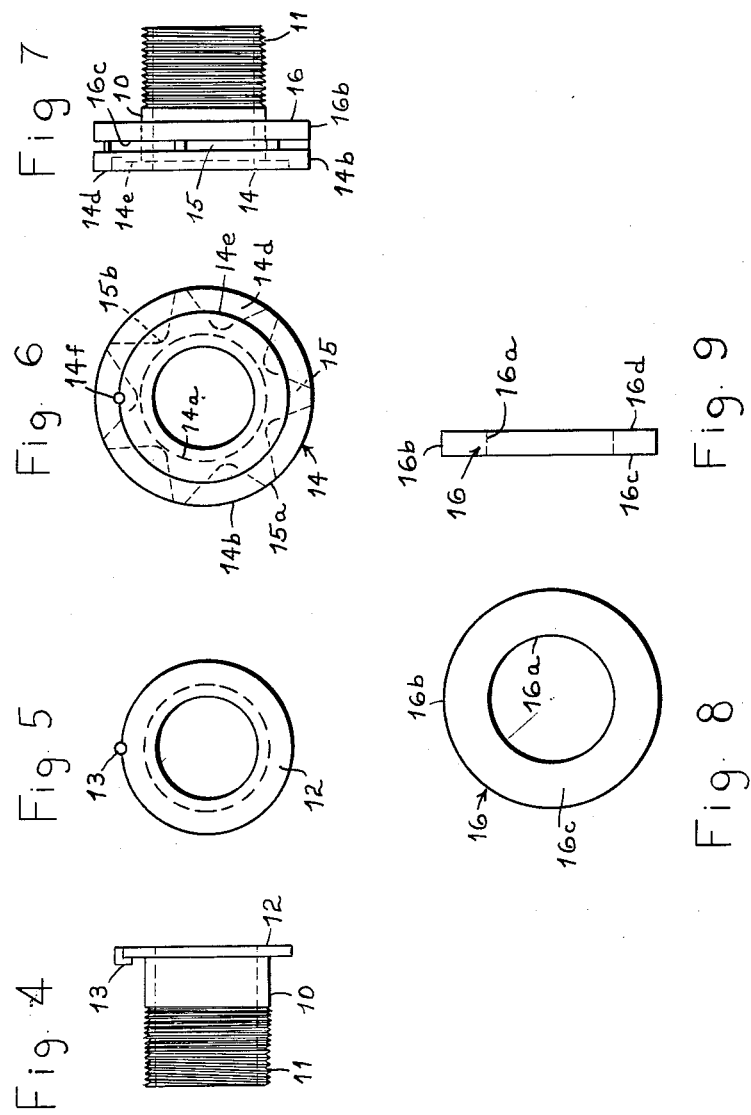
INVENTOR
Troy J. Reed
By
Pierce, Scheffler & Parker
Attorneys.

United States Patent Office 3,087,350
Patented Apr. 30, 1963

3,087,350
SPROCKET FOR SAW CHAIN
Troy J. Reed, P.O. Box 104, Pawnee, Okla.
Filed July 31, 1961, Ser. No. 128,015
1 Claim. (Cl. 74—243)

The present invention relates to an improved construction for sprockets and in particular to a driving sprocket for a saw chain.

A long conventional construction for sprockets for saw chain drives has been one in which the sprocket teeth extend radially outward from the driving hub on which they are formed and hence the weight of the saw chain is borne by the sprocket teeth themselves and the tips of the teeth in particular have been required to withstand several hundred pounds of pressure thus causing excessive tooth wear in a comparatively short length of time. Afterwards, the sprocket becomes unfit for further use since the pitch of the sprocket no longer matches that of the guide links in the saw chain. Wearing of the tips of the sprocket teeth not only puts the chain out of balance with the sprocket but also causes excessive drag on the driving motor by the binding action of the chain in the sprocket and fails to feed the chain squarely into the slot in the cutter bar of the saw.

In order to eliminate the foregoing disadvantages inherent in the use of drive sprockets with external teeth, the present invention provides a different principle of construction wherein the weight of the chain is carried by a cylindrical portion of the driving hub assembly, and the sprocket teeth lie inwardly from the periphery of this weight carrying cylindrical portion. Transferring the weight of the saw chain at the sprocket from the sprocket teeth to a cylindrical portion of the driving hub is not of itself broadly novel, there being a sprocket structure operating in this manner disclosed in U.S. Patent 2,884,798, granted May 5, 1959, to Harry Wilson. However, the particular construction illustrated in that patent is believed to be more complex and also somewhat unorthodox in that pins are utilized in lieu of conventionally shaped tapered teeth.

In accordance with the construction of the present invention, the improved sprocket is of more simple and hence less expensive construction since it has at most only three components which are assembled in a very simple manner to produce a complete drive sprocket, one component being a hub and the other two components being annular discs which are fitted onto the hub. One side face of one of these discs has sprocket teeth formed thereon and this sprocket disc is secured to the driving hub in such manner as to prevent relative rotation therebetween. For this purpose the hub preferably includes a flange which seats in a circular recess provided in the opposite face of the sprocket disc and the flange is keyed to the sprocket disc. The other disc is simply a ring with plane faces one of which is brought into engagement with the side faces of the sprocket teeth so as to thereby establish a sprocket tooth channel in which to receive the guide links on the saw chain which mesh with the sprocket teeth to establish the desired driving action for the chain. The circular rim portions of the two discs provide a rounded, i.e. cylindrical running surface engaging the side plates or links of the chain and thereby carry the weight of the chain and thus relieve the sprocket teeth themselves from this burden.

Reference will now be made to the accompanying drawings in which an embodiment of the invention is illustrated. In these drawings:

FIGS. 4 and 5 are side elevation and end views, respectively of the flanged hub component of the three-element sprocket assembly;

FIGS. 6 and 7 are end and side elevation views, respectively of the assembly of the three elements of the sprocket, namely the hub, sprocket disc and facing disc; and FIGS. 8 and 9 are side elevation and end views respectively of the plane, annular facing disc.

With reference now to the drawings, the sprocket assembly, as previously mentioned is, at most, composed of only three elements. The hub element shown in detail in FIGS. 4 and 5 consists of a cylindrical tubular part 10 which is externally threaded from one end at 11 and has a head or flange 12 at the opposite end which includes a key projection 13 which serves to key the sprocket disc to the hub.

Figure 3:
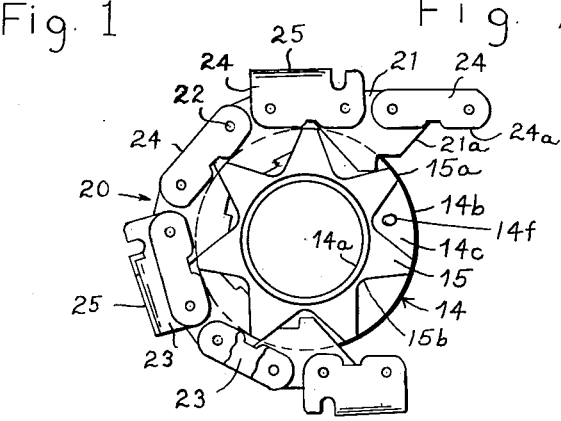
FIG. 3 is a view in side elevation of the sprocket and saw chain thereon.

The sprocket element shown in FIGS. 3, 6 and 7 in particular is composed of an annular cylindrical disc 14 having a central opening 14a of a diameter essentially matching that of the hub 10 so as to establish a close sliding fit thereon and a cylindrical rim 14b. Projecting from one face 14c of disc 14 are the sprocket teeth 15 having a trapezoidal configuration. These teeth may be machined from the face 14c of the disc or they may be stamped out or cast. The tips 15a of the teeth extend radially outward not further than the periphery of the disc, and preferably terminate at the periphery, and the roots 15b of the teeth terminate close to the inner periphery 14a of disc 14 so that the sprocket teeth 15 utilize as much as possible of the total area available on the side face for the teeth. Obviously, the tip and root circles of sprocket teeth 15 have their centers coincident with the geometrical center of disc 14 and hence the center of hub 10.

Formed in the other face 14d of disc 14 opposite the face carrying the sprocket teeth 15 is a cylindrical recess 14e having a center coincident with the disc center and a diameter essentially matching that of flange 12 on hub 10. Flange 12 is seated in recess 14e of disc 14, the hub 10 being passed through the opening in disc 14, and projection 13 on the flange 12 is entered into a complementary aperture 14f in the disc thus locking the disc and hub against rotation relative to each other.

Figure 1:
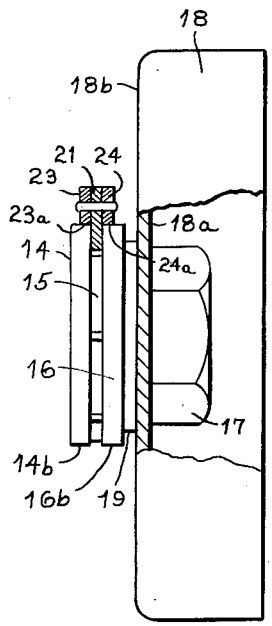
FIG. 1 is a view in side elevation of the sprocket and the drum element of a clutch attached thereto, a part of the latter being broken away.
Figure 2:
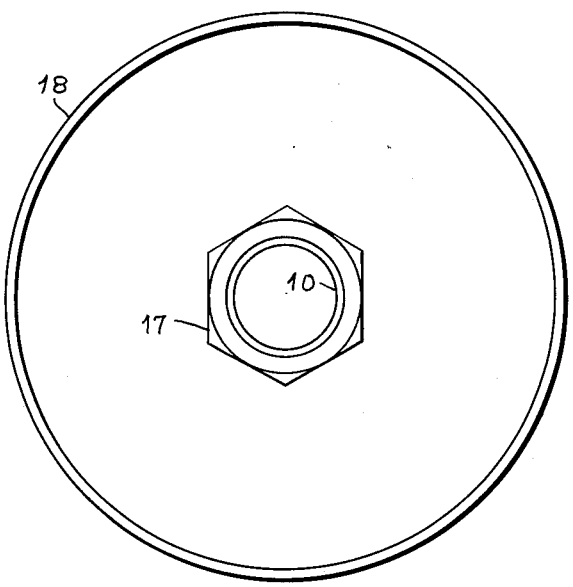
FIG. 2 is an end view looking into the drum and sprocket assembly of FIG. 1.

A second annular disc 16 having a central opening 16a of the same diameter as opening 14a in disc 14 is fitted onto hub 10. Disc 16 also has a cylindrical rim 16b of the same diameter as that of disc 14 and is of the same thickness. However, as distinguished from disc 14, the opposite side faces 16c, 16d of disc 16 are both planar and this disc is assembled on the hub as shown in FIGS. 1 and 7 so that face 16c lies in contact with the side faces of sprocket teeth 15.

In the embodiment of the invention as illustrated, hub 10, sprocket disc 14 and planar disc 16 are held in their assembled relation by screwing the threaded portion 11 of hub 10 into a nut 17 which is welded onto the inside wall 18a of a drum 18 which constitutes one element of a magnetic clutch mechanism of conventional construction and by means of which rotary driving power is imparted to the sprocket assembly. As shown in FIG. 1, hub 10 is threaded through the outside wall 18b of drum 18, and a plain washer 19 which can be made of brass can be utilized if desired on hub 10 between wall 18b of drum 18 and disc 16 as an axial spacer element to provide adequate running clearance between drum and the saw chain 20. The endless saw chain 20 which is driven by the sprocket teeth can be of known construction, for example, wherein center guide links are provided with guide tooth portions which mesh with the sprocket teeth, these guide tooth portions also being arranged to run in a rectilinear guide trough or groove of the saw frame. For example, as shown in FIGS. 1 and 3, the saw chain 20 can be composed of longitudinally spaced center guide links 21 having sprocket engaging tooth or root portions 21a. These center links 21 are pivotally connected together by pairs of side links or plates and pivot pins 22. Of each pair of side links, one such link 23 has a plane top face and the opposite side link 24 has a cutter tooth portion 25 projecting outwardly therefrom. At the next adjacent pair of side links, the cutter tooth portion 25 will be located on the opposite side of the saw chain axis. Thus the cutter teeth 25 on the side links alternate left and right with respect to the chain axis. In accordance with the invention, the tooth portions 21a of the center guide links 21 mesh with the sprocket teeth 15, and the lower faces 23a, 24a of the side links 23, 24 respectively engage the cylindrical rims 14b, 16b of the discs 14, 16 as these links pass around the sprocket assembly. Thus, at the sprocket assembly, the principal weight of the saw chain is not borne by the sprocket teeth themselves but rather, by the rim portions which results in an extremely smooth driving engagement between the saw chain and sprocket. Moreover, the sprocket teeth having been relieved of a principal part of the load imposed by the saw chain will have a low wear characteristic which leads to a longer useful life than has heretofore been possible.

In conclusion, it is to be understood that while a preferred embodiment of the invention has been described and illustrated, various modifications may be made in the construction and arrangement of parts without, however, departing from the spirit and scope of the invention as defined in the appended claim.

I claim:

In a sprocket construction for use in driving a saw chain of the type having longitudinally spaced center guide links provided with tooth portions for meshing with the sprocket teeth and pairs of side plates pivotally interconnecting consecutive guide links, said guide links being located between the side plates of each pair, the combination comprising a hub having a circular flanged portion and a key projection on said flanged portion, an annular sprocket disc mounted on said hub, said sprocket disc having a cylindrical rim, sprocket teeth projecting from one face thereof and a circular recess formed in the opposite face thereof, said flanged portion of said hub being seated in said recess and said key projection being entered into a complementary positioned aperture in said sprocket disc to retain said hub and sprocket disc against relative rotation, and a second annular disc mounted on said hub and having one face thereof in contact with the side faces of said sprocket teeth, said second disc also having a cylindrical rim and being of the same diameter as said sprocket disc, the tooth portions of the center guide links of the saw chain being adapted to mesh with said sprocket teeth in the space esablished between the faces of said discs and the side plates of each pair being adapted to bear respectively upon the rims of said discs.

References Cited in the file of this patent

UNITED STATES PATENTS

| | | |
|---|---|---|
| 2,799,174 | Pelletier | July 16, 1957 |
| 2,884,798 | Wilson | May 5, 1959 |